BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1037

T-857,039

HIGH DENSITY NON-WOVEN FIBROUS BATT

Joseph Mark Perri, Waynesboro, Va., assignor to E. I. du Pont de Nemours and Company, Wilmington, Del., a corporation of Delaware Filed June 8, 1966. Published Dec. 24, 1968
Class 161—170
No Drawing. 11 Pages Specification High-density non-woven structures, which are easily converted to low-density structures on mechanical working, comprising acrylic bicomponent fibers with a recoil-index of about 60 to about 90 and in which the more hydrophobic component comprises about 60 to about 75% of the fiber. Discrete areas of inter-filament entanglement and bonding amount to 10% or less of the total volume. An original density of 29 to 36 lbs./ft.$^3$ is reduced to 3 to 10 lbs./ft.$^3$ by gentle mechanical working. Preferably, the staple fibers are side-by-side bicomponent fibers in which one component is polyacrylonitrile and the other component is a copolymer of acrylonitrile and sodium styrene sulfonate, e.g. 96% acrylonitrile and 4% sodium styrene sulfonate.

$$\text{Recoil index} = \frac{(L_a - L_b)}{L_a} 100,$$

where $L_a$ is the extended length of the fiber and $L_b$ is the largest dimension of the fiber after retraction.